United States Patent Office 3,188,730
Patented June 15, 1965

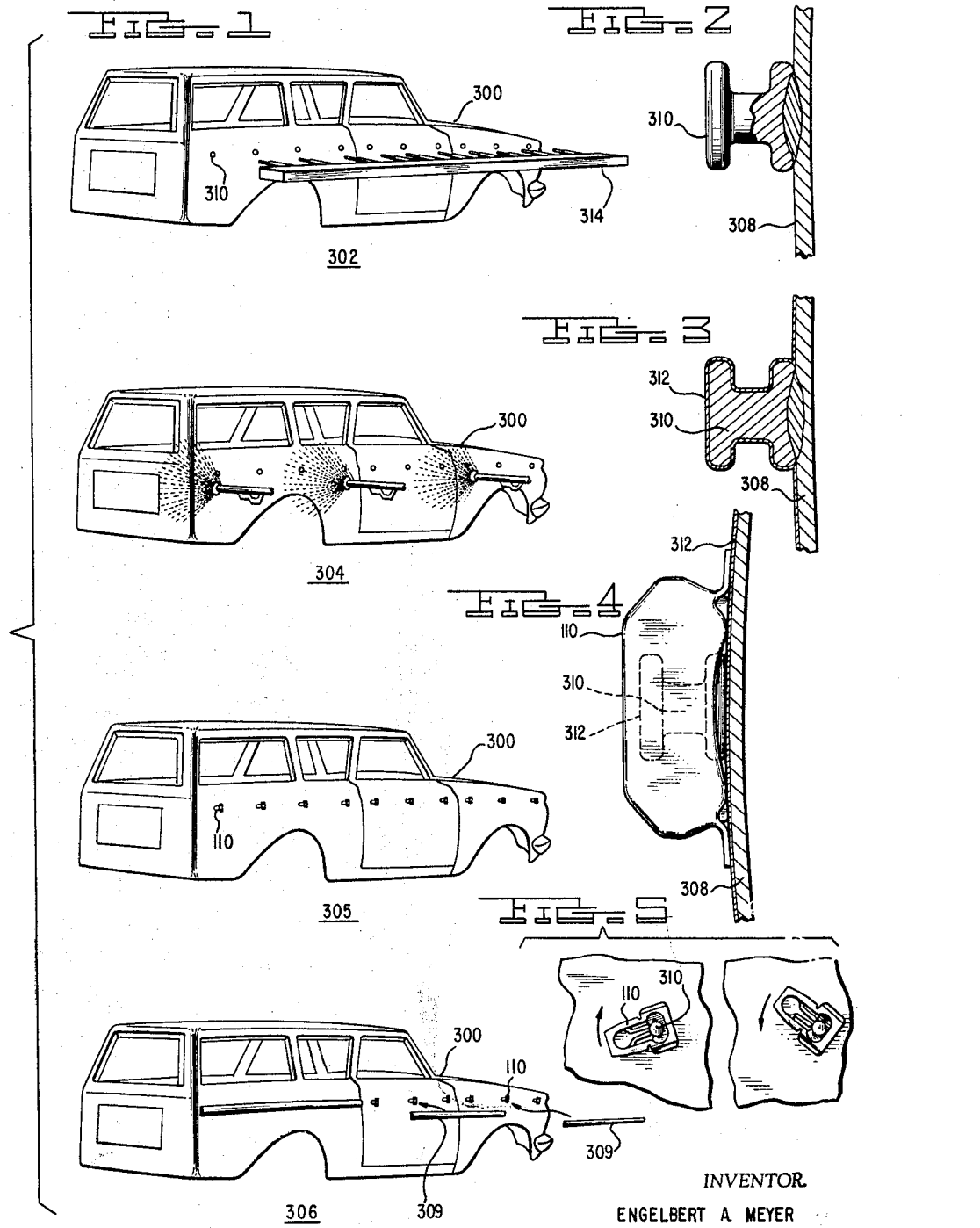

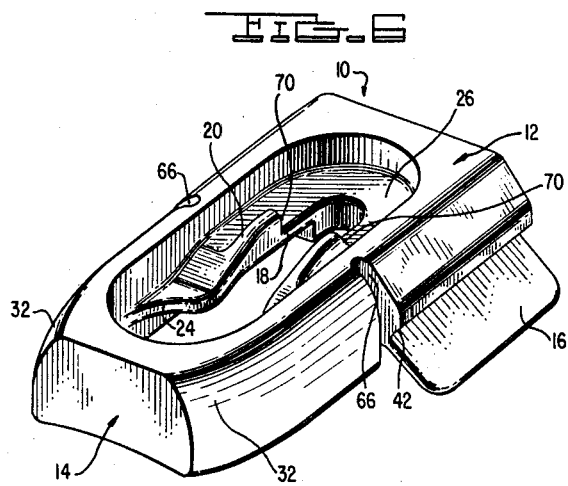
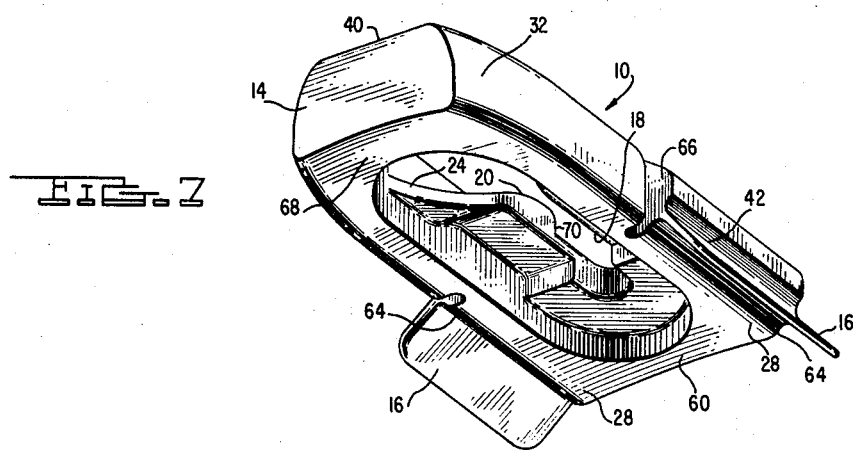
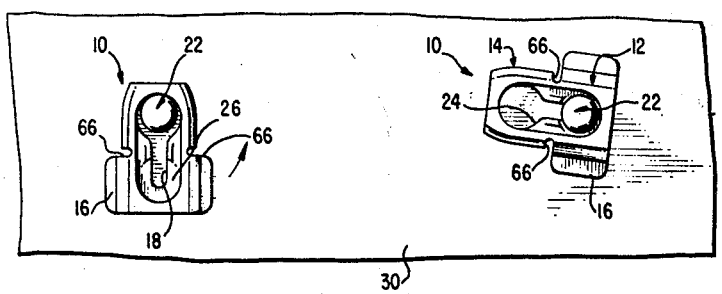

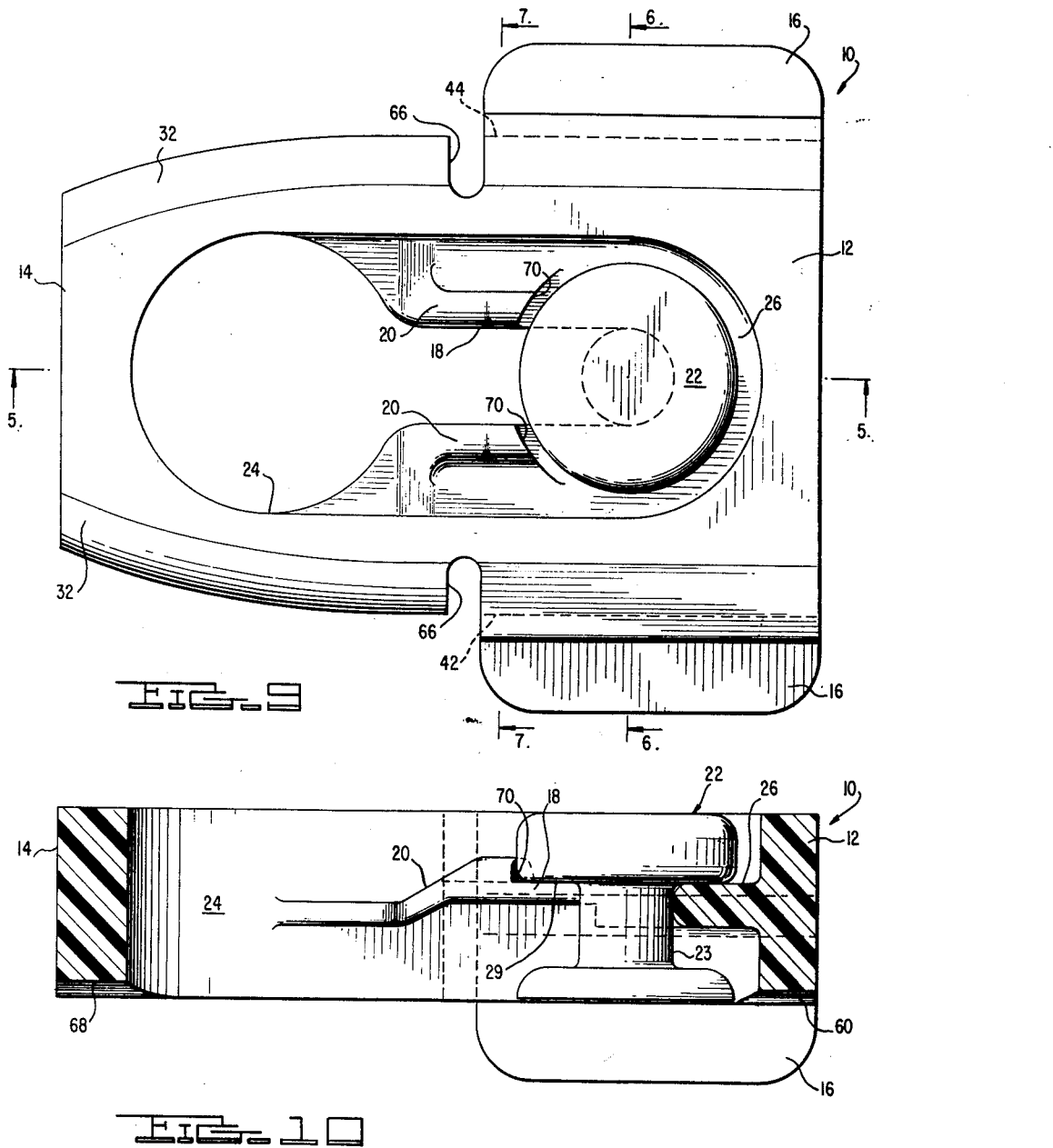

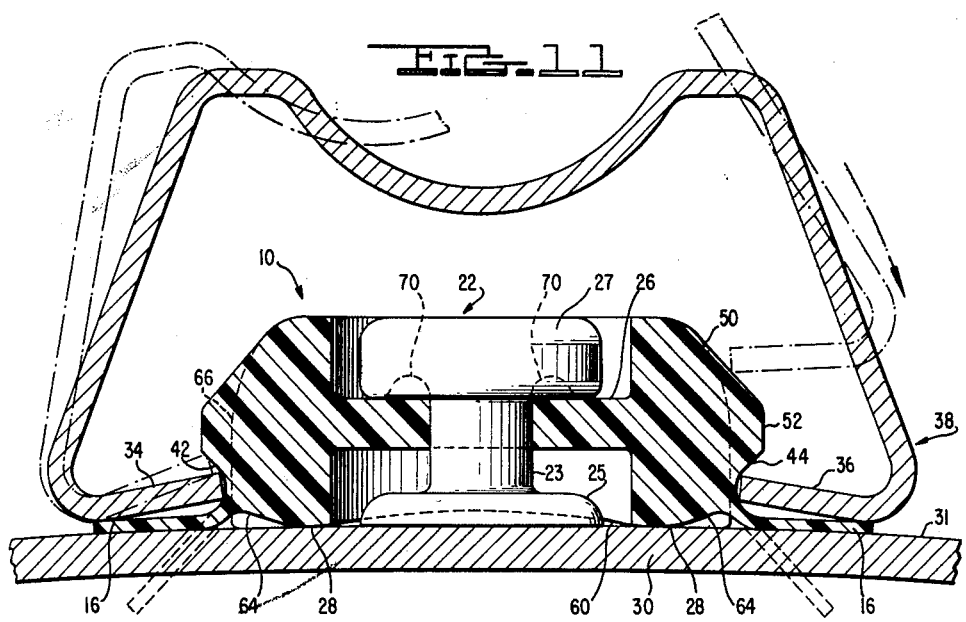
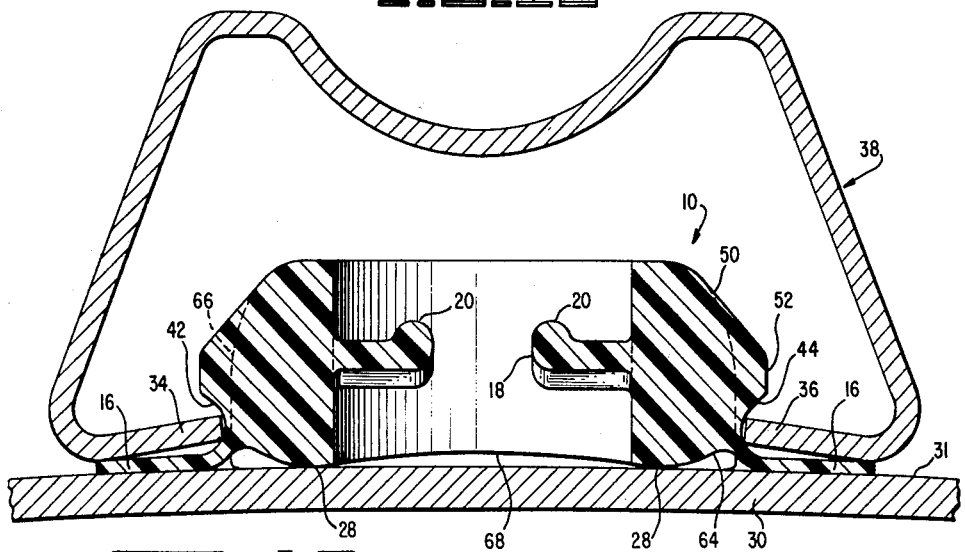
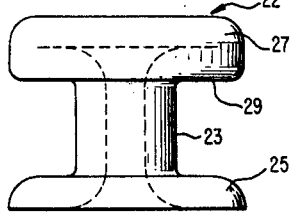
INVENTOR.
ENGELBERT A. MEYER
BY *Burton + Parker*
ATTORNEYS

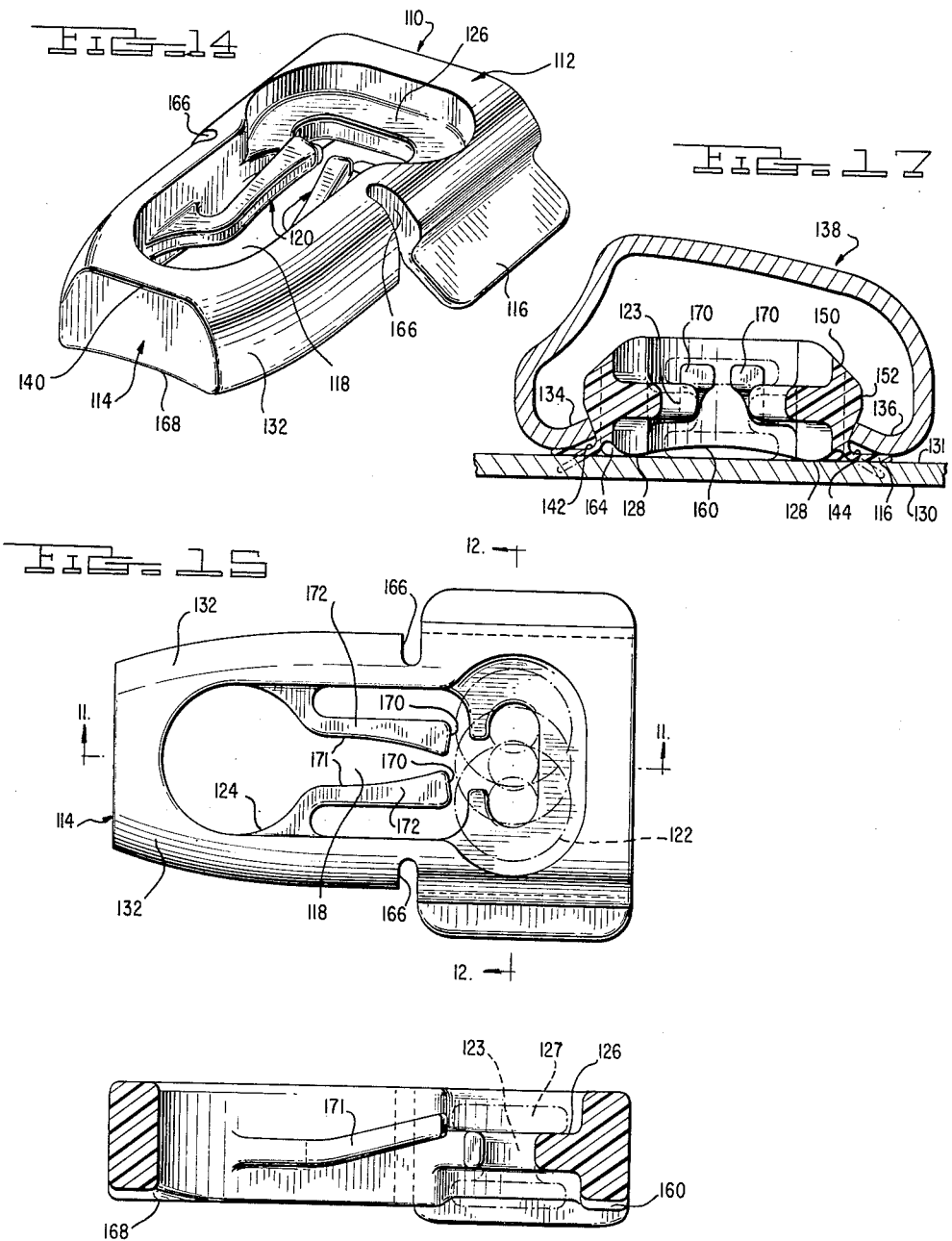

3,188,730
METHOD OF FINISHING AUTOMOBILE PANEL
AND SECURING TRIM THERETO
Engelbert A. Meyer, Union Lake, Mich., assignor to
Chicago United Products Company, Inc., Detroit,
Mich., a corporation of Michigan
Filed Jan. 15, 1964, Ser. No. 337,868
10 Claims. (Cl. 29—430)

This application is a continuation-in-part of my application Serial No. 297,413 filed July 24, 1963.

My invention relates to a method of assembling automobile parts wherein a hollow molding device or trim strip having opposed flanges is distorted within its elastic limits as it passes over and finally aligns an adapter into proper position and snaps into an anchored position thereon, the adapter having previously been distorted within its elastic limits and snapped into an anchored position on a protuberance integral with and extending from the surface of an automobile panel.

More particularly, my invention relates to a method of assembling a trim part on an automobile panel wherein an automobile panel protuberance part, an adapter part, and a trim part are brought into an ordered association, the adapter part being distorted within its elastic limits as it is moved into anchored position on the automobile panel protuberance part, and the trim strip part being distorted within its elastic limits as it moved into anchored position on the adapter part, this final juxtaposition of parts including the step of aligning the adapter part into a predetermined alignment with the trim strip part to facilitate final anchoring.

My method comprises the finishing of a panel and also an automobile body unit formed from such panels, the body unit being moved from work station to work station in an automobile assembly line to accomplish steps of welding, painting, and assembly.

Molding devices are used in the manufacture of automobiles, refrigerators and the like to meet functional and design requirements.

Preferably the button is attached to the support in accordance with the invention shown in the co-pending application of the assignee of the instant application, Serial No. 179,128, wherein the button is welded to steel or adhesively secured to various materials including steel, thereby eliminating the corrosion problem inherent in previously used techniques requiring a hole through the support. A series of spaced buttons for a single longitudinal molding device may be applied in a gang operation with accurate alignment.

The button is small; in fact, somewhat miniature in size in comparison to previously employed fasteners in the automobile trim field. A suitable size presently used in automobile manufacture involves a button .200 inch in diameter at its head and .160 inch high, the shank of the button being less than one half the diameter of the head. Utilization of this new concept of trim attachment in the automobile field provides substantial economies and advantages in the manufacturing and warehousing doors, fenders and the like. Similar economies and advantages are attainable in many other fields, such as home appliances, refrigerators, stoves and the like. Business and electronic equipment offer other areas of commercial development.

The instant invention will be discussed in the context of an automobile molding device assembly.

An adapter is provided which may be applied in assembly line operation to a previously attached button on the automobile component such as a door, this component and button having been processed through finishing and painting operations.

On the assembly line, the adapter is connected to a button by a keyhole slot arrangement, the body of the adapter coacting with the button to produce a frictional seating of the adapter on the automobile component in an approximate final alignment for acceptance of a flanged molding device, the opposed inturned flanges of which are snapped over the adapter to lock the molding device on the automobile support.

The adapter need not be accurately aligned prior to the application of the molding device. A pilot is provided on the adapter which is engaged by the inturned flanges of the molding device, thereby camming the adapter into final aligned position. The pilot of the adapter can be formed to correct a misalignment of about 45 degrees, the mere pressing application of the molding device causing the desired predetermined final alignment of the adapter for final locking of the molding device thereto. Laterally extending non-metallic fins are employed to provide insulation against electrolytic corrosion of the metal parts, the fins being sandwiched between the molding device and the surface of the automobile support.

Other objects, advantages and meritorious features will more fully appear from the following specifications, claims and accompanying drawings wherein:

FIG. 1 is a schematic view showing the method of the invention;

FIG. 2 is a side view partly in section showing the button stud welded to the automobile panels of the body unit;

FIG. 3 is a side view in section similar to FIG. 2 showing the sealed condition of the welded joint;

FIG. 4 is a side view showing the adapter mounted on the button;

FIG. 5 is a front view showing mounted adapters with arrows indicating their movement into aligned positions during the final steps of the method;

FIG. 6 is a perspective view of the top of the adapter;

FIG. 7 is a perspective view of the bottom of the adapter;

FIG. 8 is a somewhat schematic side view showing a portion of an automobile panel with an adapter hanging freely on the left and an adapter wedged into an approximate final position on the right;

FIG. 9 is a top plan view of the adapter (a free unconnected button is shown in seated position);

FIG. 10 is a cross sectional view taken on line 5—5 of FIG. 9;

FIG. 11 is a cross sectional view taken on line 6—6 of FIG. 9 with a button connected (welded) to a support and a molding device snapped in place; the adapter's fins and the molding device are additionally shown in dotted lines in free unstressed positions;

FIG. 12 is a cross sectional view similar to FIG. 11 but taken on line 7—7 of FIG. 9;

FIG. 13 is a side view of a button made on an eyelet machine;

FIG. 14 is a perspective view of the top of a spring finger adapter;

FIG. 15 is a top plan view of the spring finger adapter (a free unconnected button is shown in phantom in three positions of adjustment);

FIG. 16 is a crosss sectional view taken on line 11—11 of FIG. 15; and

FIG. 17 is a cross sectional view taken on line 12—12 of FIG. 15 with the button shown in phantom connected to a support and a molding device snapped in place; the adapter's fins are additionally shown in dotted lines in free unstressed positions.

Referring now to FIGS. 1–5, it will be noted that the steps of the preferred method are somewhat schematically shown in FIG. 1 with an automobile body unit 300 progressively positioned at each of four finishing or work stations of an automobile body assembly line. FIG. 2 shows the condition of the automobile panel 308 after welding a button 310 thereto at work station 302, it being apparent this fastener element or button 310 has contour characteristics smoothly blending with the panel surface of the body unit.

FIG. 3 shows the condition of the automobile panel 308 and button 310 after the finishing step at paint station 304 whereby a film 312 of paint or the like is applied and dried to provide the continuous film 312 which seals the continuous peripheral joint between the panel surface and the button against corrosion.

It will be understood therefore that an automobile body unit 300 may be moved to the work station 302 where buttons 310 are welded thereto, as by stud welding by the gang welding equipment 314 shown, a series of buttons being shown welded at predetermined locations.

After welding and finishing which may include application of a paint coat to the panel and buttons to provide the arrangement shown in FIG. 3, and/or which may also include sanding and/or buffing, the body unit 300 is moved to work station 305 where adapter, such as the preferred spring finger adapter, 110 is slid into anchored or locked position on the button 310 as shown in FIG. 4.

After the buttons have been equipped with adapters, the body unit is moved to work station 306 where trim part 309 is brought into ordered association with a series of adapters 110. One flange of the trim part 309 engages similar sides of a series of adapters 110 and then upon inward pivoting of the trim part, the other flange engages the other similar sides of the adapters and springs into anchored position thereon in overlying completely housing and concealed relationship to the adapters 110 and buttons 310.

FIG. 5 shows possible positions of adapters after being mounted on their buttons at work station 305. The adapters shown have converging side walls which enable the adapters to be finally aligned into proper position by the trim part when the flanges thereof contact these walls as will be described more fully, movement of the adapters to proper final position being indicated in FIG. 5 by arrows.

It is to be understood that the body unit 300 may be subject to pickling and/or bonderizing operations and be in-the-white before as well as after the welding of the buttons thereto. Also it is to be understood that buffing and sanding operations may take place after the buttons have been welded to the body panels, these operations being made possible by the smooth contour characteristics of the fastener elements or buttons.

The small fastener elements or buttons specifically described herein all may be characterized as being of BB-shot size, pea size, pearl size or the like, each having contour characteristics smoothly blending with the surface of the body unit or automobile panel.

Referring now to FIGS. 6–10, it will be seen that the adapter 10 includes a body 12 and a longitudinally aligned pilot 14 with lateral fins 16 extending downwardly at an angle from the bottom of the body. The body 12 has a longitudinal slot 18 on the sides of which are runners 20 which provide complementary cams for the button 22. An enlarged opening 24 is provided in the pilot 14 which connects with the body slot 18 to form a keyhole slot, the enlarged opening as seen in FIG. 8 being of sufficient size to receive the head of the button 22. The adapter 10 if allowed to remain in this condition would swing through gravity to the position shown on the left side of FIG. 8. On installation of the adapter, however, it is approximately aligned and slid forward to the position shown on the right side of FIG. 8, whereby the shank 23 (FIG. 10) on the button 22 is within the body slot 18 and the head of the button is seated in the button seat 26 of the body. The adapter, on being moved to final seated position, is biased inwardly by complementary cams on the button surface 29 and runners 20. When in final position, a frictional face-to-face engagement of the longitudinal bases 28 with the support 30 is produced which maintains the adapter in a fixed position on the support. The fins 16 are also placed in a biased condition by this movement and aid in the maintenance of the adapter in an approximate aligned condition, the fins 16 being swung to a flattened condition substantially coplanar with the base 28.

The adapter need not be accurately positioned in a final aligned condition. However, in some situations, final alignment may be desirable in which case the adapter can be so aligned and reliance place of the frictional mounting to maintain the alignment of a single or a plurality of adapters.

The pilot 14 extends longitudinally forwardly from the body 12 of the adapter and provides dome-like camming surfaces 32 extending downwardly from its narrow top which the inturned flanges 34, 36 (FIG. 11) of the molding device 38 engage upon inward attaching movement, thereby causing an orienting turning or rotation of the adapter around the button into the required alignment. It will be noted that the dome-like camming surfaces 32 on the outer side walls of the pilot converge to a nose 40 at the forward end of the pilot, this convergence enabling the flanges 34 and 36 to swing the adapter to the required aligned position.

As the adapter is moved toward final position, flange 34 seats itself firmly in groove 42 (FIG. 11.) and establishes the final alignment of the adapter. The molding piece 38 is then in about the position shown in dotted lines in FIG. 11. It will be noted in FIG. 9, that the rearward and widest portions of the camming surfaces 32 are in substantial alignment with the groves 42 and 44 shown in dotted lines; this aids in the alignment of the adapter since the flange 34 will be guided thereby into groove 42.

As seen in FIGS. 11, 12 and 13 the molding assembly includes the automobile metal panel support 30 which has an outer surface 31 to which is attached, as by welding, a headed button 22 having a shank 23 with an enlarged bottom 25 welded to the surface 31, and a head 27 having at its inner surface a cam surface 29 which coacts with and complements the runners 20 of the adapter and which engages the button seat 26.

The molding device 38 is a longitudinally extending hollow device having opposed inturned longitudinal inner flanges 34 and 36. On installation, one of the flanges 34 is moved into the longitudinal groove 42 on one side of the body 12 as discussed above and the other inturned flange 36 is then pressed against the tapered slide 50 of the body to expand the molding device, after which flange 36 moves past vertical side wall 52 and springs into groove 44. It will be noted that non-metallic fins 16 extend laterally of the body 12 adjacent the inner or bottom portion of the grooves 42 and 44 and upon application of the molding device serve as insulation against electrolytic corrosion between the device and the support, the fins 16 being sandwiched therebetween as shown in FIG. 11. This arrangement spaces the molding device from the automobile support thereby allowing air circulation under the molding device in the portions between adapters to evaporate moisture and inhibit corrosion difficulties.

Critical manufacturing and assembly tolerances are met by the body design. The adapter has a concave inner surface 60 (FIG. 11) and is equipped with spaced longitudinal bases 28, 28, one on each side of the slot, which engage the automobile support, the adapter being relieved by channels 64, 64, at the juncture of the fins 16 with the body 12 to eliminate any effect of their biased condition on the maintenance of the bases 28, 28 in face-to-face dimension controlling contact with the automobile support 30. Top-to-bottom transverse cut-out portions 66, 66 (FIG. 8) between the body 12 and the pilot 14 are also provided for this purpose, it being recognized that the inner bottom concave face 68 of the pilot also aids in establishing the required dimensional stability of the assembly.

The runners 29, 20 are located at each side of the forward portion of the slot 18 in the body 12, the runners providing rearwardly outwardly tapering camming surfaces which extend longitudinally rearwardly of the body. At the rearward ends of the runners, outwardly extending stops 70, 70 (FIG. 6 and FIG. 11 in dotted lines) are provided which define the forward end of the button seat. The tops 70, 70, in FIG. 9 being shown slightly forward of the button head to emphasize a slight clearance to insure full seating of the button on seat 26.

While various materials may be used for all parts, the automobile industry utilizes metal primarily for the automobile support and for the molding device. Steel is primarily used for the automobile support with stainless steel being used for button as well as with cold rolled zinc plated steel. The buttons are stud welded to a prefabricated automobile support, before painting, in a predetermined orientation. After cleaning, coating and polishing the automobile support is ready to receive the adapter. Preferably the adapter is made of a non-metallic material to provide an electrolytic corrosion insulator between the non-similar metal parts, suitable plastics being Celcom, Delrin, or nylon.

The molding device is made of stock about .035 inch thick with a height of about .410 inch. The tapered slide 50 on the body 12 is preferably about .025 inch to about .030 inch long ending at a blunt wall 52 instead of a point, to prevent pealing, followed by an inner slide surface forming the outer wall of groove 44 which induces the inturned flange 36 into final seated condition. The fins are about .010 inch and extend approximately 45 degrees from the bases 28, 28 of the body when free. Upon installation of the adapter on the button, the button seat may be drawn inwardly a significant amount of about .005 inch depending upon variations in manufacturing tolerances which tend to flatten somewhat the concave inner surface 60 of the body. As mentioned the concave inner surface 60 provides control of dimensional requirements and prevents a rocking situation which might possibly develop if a convex attitude were allowed.

Referring to FIGS. 11 and 13, it will be noted that the button 22 when seated engages the adapter 10 in two respects, one being a substantially horizontal seating engagement of the inner or bottom button surface 29 with the outer or top button seat 26 and the other being the substantially vertical frictional engagement of the button shank 23 with the substantially vertical sidewalls of the slot 18 in the adapter. Frictional forces at these areas of engagement maintain the adapter in its seated position. Stops 70, 70 are positioned to engage button 22 and specifically button head 27 and thereby limt the area of movement and effectively lock the button in its seat.

The specific button described hereinabove in terms of dimensions has a shank 23 which is 0.08 inch in diameter designed to be frictionally engaged by and received in adapter slot 18 which has a width of 0.08 inch, the same as the shank diameter. As mentioned, the adapter is preferably made of plastic; another plastic being ultraviolet stabilized-polypropylene. The plastic material provides a biased clamping frictional engagement of the adapter 22 on the button's shank 23, this condition being developed along the entire length of the slot 18 as relative movement is imparted to the parts.

A preferred modification is shown in FIGS. 14–17, numerals of the 100-series being used to correlate FIGS. 6–13 therewith where appropriate. All of the description hereinabove is applicable to FIGS. 14–17 with appropriate correlations being made to select the pertinent figures. It will be noted, for example, that adapter 10 of FIG. 6 becomes adapter 110 of FIG. 14 in the preferred embodiment; similarly FIG. 9 is correlated with FIG. 15; FIG. 10 is correlated with FIG. 16; and FIG. 12 is correlated with FIG. 17.

Referring now to the preferred embodiment of FIGS. 14–17 it will be seen that runners 120 are provided by spring fingers which laterally or transversely converge toward each other as they extend longitudinally toward the button seat 126. The spring fingers 120 also extend outwardly or upwardly as they extend longitudinally toward the button seat 126.

As the adapter is slid onto the button, the shank of the button is engaged by the inner opposed vertical walls 171, 171 of the spring fingers 120 and the lower surface of the button head is engaged by the upper surfaces 172, 172 of the spring fingers, thereby distorting the spring fingers within their elastic limits transversely or laterally outwardly to allow passage of the button shank. The spring fingers are similarly distorted downwardly to allow passage of the button head. When the adapter has been slid sufficiently to seat the button head on the button seat 126, the spring fingers spring back to their normal unstressed condition and lock the adapter on the button; it will be noted in FIG. 17 the lock surfaces 170, 170 at the terminal ends of the spring fingers spring back to a normal unstressed position in alignment with the button head to insure anchoring of the adapter on the button.

Each spring finger 120 is attached at its inner forward end to the body 112 from which it extends freely rearwardly and upwardly forming one side of slot 118, each spring finger 120 of the preferred embodiment and each runner 20 of the first described embodiment providing resilient distortable portions adjacent slot 118 and 18 respectively to enable locking action with the button.

It will be noted that slot 118 is transversely enlarged at the button seat 126 to enable transverse alignment of the adapter either prior or during trim application.

Preferably the spring finger adapter is formed from a plastic material of the character heretofore mentioned which may or may not be fiber-filled as required.

I claim:

1. The method of finishing an automobile panel including the attachment of a hollow automobile trim part having opposed flanges to an automobile panel by means of an adapter comprising the steps of moving the automobile panel in an unfinished state to successive work stations, welding a series of BB-shot size headed buttons with contour characteristics smoothly blending with the panel surface to the automobile panel throughout the entire extent of contact of the buttons with the panel at predetermined locations coordinated with the predetermined desired position of said trim part on said panel and coordinated with the shape of said trim part, said welding being accomplished at the surface of the automobile panel and without perforation thereof and producing a completely exposed continuous peripheral joint between each of the buttons and the panel surface, moving the panel to a painting work station, finishing the surface of the automobile panel including applying a coating of paint thereto and over the buttons to provide a continuous film which seals the continuous peripheral joints between the panel surface and the buttons against corrosion, moving the panel to a subsequent work station, mounting a plastic adapter on each of said headed buttons by moving said adapter inwardly to receive said headed button through a hole in the adapter, then sliding the adapter along the automobile panel to seat the bottom inner surface of the headed button on a top outer surface of the adapter which forms a button seat by camming distortion of a resilient runner of the adapter during sliding movement thereof, said runner springing back to lock the button at the button seat, bringing the hollow trim part into ordered association with a series of the adapters mounted on said automobile panel including interlockingly engaging one flange thereof with sides of such series of adapters and then inwardly pivoting the trim part thereabout and forcing the other flange of the trim part over the other sides of the series of adapters to distort the trim part within its elastic limit and then allowing said other flange thereof to spring into interlocking engagement with said other sides of said adapters in overlying substantially completely housing and concealing relationship thereto.

2. The method of claim 1 and including the step of finally aligning the adapters into positions coordinated with the trim strip by manipulating flanges of the trim strip against converging side walls of the adapters to pivot the adapters into aligned positions prior to said forcing step to complete the assembly.

3. The method of finishing a metal automobile body panel including the painting thereof and attachment thereto of trim comprising: moving the body panel through successive finishing stations, at one station welding to the body panel while in an unfinished state a plurality of metal buttons of BB-shot size and smooth uniform shape with contour characteristics smoothly blending with the surface of the body panel at predetermined locations coordinated with the predetermined desired position of the trim, accomplishing said welding at the surface of the body panel and throughout the entire extent of contact of the buttons with the body panel and without perforation of the body panel and producing a completely exposed continuous peripheral joint between each of the buttons and the surface of the body panel, at a subsequent finishing station painting the panel, said painting including the application to the body panel and to the buttons of at least one paint coat providing a continuous paint film which seals the continuous peripheral joints between each of the buttons and the body panel against corrosion, and after drying the paint and at a further subsequent finishing station securing to each button an adapter, and then bringing the trim into ordered association with the buttons and resiliently connecting the trim to the adapters in overlying substantially completely housing and concealing relationship with the buttons.

4. The method as defined in claim 3 and characterized in that the step of securing each adapter to its respective button includes distorting the adapter within its elastic limits to produce a biased connection with the button.

5. The method as defined in claim 4 and including the further step of slidably shifting the resultant combination of trim and adapter relative to the buttons to bring the trim into alignment with the predetermined desired position.

6. The method as defined in claim 4 and including the step of rotating an adapter about its respective button into the alignment required for attachment thereto of said trim.

7. The method as defined in claim 6 and characterized in that the rotating step is accomplished by urging a flange of the trim against the adapters just prior to resilient connection of the trim thereto.

8. The invention as defined in claim 4 characterized in that the trim is resilient and is provided with opposed marginal flanges, and the step of resiliently connecting the trim to the adapters includes forcing the flanges against the adapters to distort the trim within its elastic limit causing the flanges to spread apart and grippingly engage the adapters to effect a biased anchorage of the trim on the adapters.

9. The method as defined in claim 4 characterized in that upon distorting the adapter within its elastic limits it is sprung into position between the button and the panel and yieldingly held therebetween against lateral shifting.

10. The method as defined in claim 3 in that the step of connecting the adapters to the buttons is characterized by distorting each adapter, within its elastic limits, against its button to bias it inwardly toward the panel to a position at which it is supported against further inward movement and yieldingly resists lateral shifting on the button.

References Cited by the Examiner

UNITED STATES PATENTS

| | | | |
|---|---|---|---|
| 1,238,206 | 8/17 | Shuler | 219—107 X |
| 1,449,829 | 3/23 | Miller | 29—460 X |
| 1,908,226 | 5/33 | De Long | 29—460 |
| 1,960,042 | 5/34 | Andrus | 219—107 X |
| 2,039,110 | 4/36 | Patchen | 24—222 X |
| 2,112,178 | 3/38 | Selph | 189—88 X |
| 2,403,057 | 7/46 | Davis | 24—222 X |
| 2,517,411 | 8/50 | Patterson | 29—460 X |
| 2,757,447 | 8/56 | Barenyi | 29/430 |
| 2,779,092 | 1/57 | Gordon | 29/430 |

WHITMORE A. WILTZ, *Primary Examiner.*